United States Patent [19]

Davies

[11] Patent Number: 4,897,876
[45] Date of Patent: Jan. 30, 1990

[54] METHOD OF AND AN ARRANGEMENT FOR DIGITAL SIGNAL ENCRYPTION

[75] Inventor: Andrew K. Davies, Purley, England
[73] Assignee: U.S. Philips Corp., New York, N.Y.
[21] Appl. No.: 189,010
[22] Filed: May 2, 1988
[30] Foreign Application Priority Data

May 1, 1987 [GB] United Kingdom ................. 8710382

[51] Int. Cl.$^4$ .............................................. H04L 9/00
[52] U.S. Cl. ........................................ 380/43; 380/44
[58] Field of Search ....................... 380/43, 44, 45, 46, 380/47

[56] References Cited

U.S. PATENT DOCUMENTS

| | | | |
|---|---|---|---|
| 3,984,668 | 10/1976 | Zetterberg et al. | 380/46 |
| 4,447,672 | 5/1984 | Nakamora | 380/44 |
| 4,634,808 | 1/1987 | Moerder | 380/45 |
| 4,712,238 | 12/1987 | Gilhousen et al. | 380/44 |
| 4,760,600 | 7/1988 | Nakai | 380/44 |
| 4,802,217 | 1/1989 | Michner | 380/46 |

Primary Examiner—Salvatore Cangialosi
Attorney, Agent, or Firm—Emmanuel J. Lobato

[57] ABSTRACT

An improved arrangement for digital signal encrytion using a cipher algorithm in which a multi-bit key signal is used to produce a first keystream signal of coding bytes which are used in an exclusive-OR logical operation with data bytes of a received digital data signal to produce an enciphered/deciphered output digital data signal. Hitherto, the keysteam signal was also fed back into the algorithm for processing with the key signal, but this was found to result in an insecure arrangement because the keystream signal can be found by exclusive-ORing the received digital data signal with only a few bytes of the output data signal that are already known, following which the key signal itself can be deduced by a fairly simple trial-and-error computing procedure. The improvement consists in feeding back into the algorithm a keystream signal which is not the same as that used for the exclusive-OR logical operation. This different keystream signal can be produced either directly or indirectly from the keystream signal used for the exclusive-OR logical operation. FIGS. 3 and 7 show these two possible ways of producing the different keystream signal.

26 Claims, 5 Drawing Sheets

METHOD OF AND AN ARRANGEMENT FOR DIGITAL SIGNAL ENCRYPTION

DESCRIPTION:

This invention relates to a method of digital signal encryption involving a cipher algorithm in which a keystream signal is used in an exclusive-OR logical operation with a digital data signal to produce an enciphered digital data signal. With such a method, the same keystream signal and algorithm are also used to restitute the original digital data signal, in which case the data signal would, in effect, be an applied enciphered data signal and the resultant enciphered data signal would be an output deciphered data signal.

As part of the cipher algorithm, some form of feedback control may be exercised in order to increase the complexity of the manner in which the keystream signal is produced and various ways of doing this are already known in the art. A first example is described in PCT patent specification WO 80/02349 (A1) which relates to an apparatus for enciphering and deciphering data signals. In an enciphering mode a clear text bit stream is added to the output signal of a first pseudo-random bit generator and the sum signal is then added to the output of a second pseudo-random bit generator to produce an enciphered bit stream. The first generator is stepped by a sum signal formed by adding the clear text bit stream to the output signal of the second generator and the second generator is stepped by a sum signal formed by adding the clear text bit stream to the output signal of the first generator. In a deciphering mode an enciphered bit stream as produced above is added to the output signal of the first generator and the sum signal is then added to the output signal of the second generator to re-form the clear text bit stream. The generators are stepped by respective sum signals formed by adding the enciphered bit stream to the output signal of each generator itself. In each mode the generator outputs form two successive keystream signals.

A second example is described in European patent specification 0 035 048 (A1) which relates to a variable key matrix cipher system for enciphering an input stream of binary data. The bits of the data stream are modulo-two added to selected bits of a key matrix to produce a resultant output stream of binary data. The selected bits of the key matrix which are used for the modulo-two addition are progressively modified in two ways, firstly by inputting these selected bits to a non-affine transformation device which is responsive thereto to change selected elements of the key matrix and, secondly, by using bits of the resultant output stream of binary data to re-arrange or scramble the elements of the key matrix. The selected bits outputted from the key matrix from the keystream signal.

In each of these two prior art examples the feedback control which is exercised involves the actual data which is being enciphered or deciphered. In a third prior art example as described in European patent specification 0 119 972 (A1) there is exercised a feedback control which does not involve the actual data being processed. This third example relates to apparatus for ciphering/deciphering digital messages. The apparatus includes circulation registers which are set to an initial content by a predetermined inner key, together with a logic unit which produces a keystream signal on the basis of output pulses from the circulation registers. Pseudo-random control pulses are fed back from the logic unit to the circulation registers to continually vary their content.

Applicants co-pending Application GB 8601175 describes a teletext decoder which operates using a particular form of cipher algorithm to descramble received scrambled teletext messages and also to decrypt received encrypted key signals for use in the algorithm. In this particular form of cipher algorithm a feedback control not involving the actual data being processed is utilised.

FIG. 1 of the accompanying drawings shows a block diagram which represents this particular form of cipher algorithm as used for descrambling teletext messages which have been scrambled using the same algorithm. For this algorithm, a 64-bit secret key signal K is loaded into a key register KEY-K. A second register REG-R is loaded with a 64-bit initial number signal I which, preferably, is a random number having an impulse autocorrelation function. The key signal K and the number signal I are combined one 8-bit byte at a time by a one-way function OWF which produces a resultant keystream signal Ks of successive 8-bit bytes. This keystream signal Ks is applied as one input to an exclusive-OR logical operation XOR.

An enciphered data signal CDs, composed of 8-bit data bytes and representing a scrambled teletext message which is to be descrambled, is applied as a second input to the exclusive-OR logical operation XOR. Corresponding bits of successive keystream bytes and successive data bytes are exclusive-OR'd by the logical operation XOR. The resultant deciphered data signal Ds is a descrambled version of the teletext message that was originally scrambled.

As part of the cipher algorithm each byte of the keystream signal Ks which is applied to the exclusive-OR logical operation XOR is also loaded into the register REG-R, so that the number signal I is progressively altered one 8-bit at a time in respect of the exclusive-OR logical operations performed on the bits of successive keystream bytes and successive data bytes.

It has now been realised that the direct feedback of the keystream signal Ks to the register REG-R can be detrimental to the security afforded by the cipher algorithm. This may be explained as follows with reference to FIG. 2, which shows some idealised digital waveforms. The waveform Dsi represents a single bit stream of a data signal composed of 8-bit bytes in parallel and representing a teletext message to be scrambled. The waveform Ksi represents a single bit stream of a keystream signal corresponding to the keystream signal Ks produced by the alogorithm of FIG. 1. The waveform CDsi represents a single bit stream of the enciphered data signal CDs applied as a second input to the exclusive-OR logical operation XOR. The waveform Dsi' represents a single bit stream of the deciphered data signal Ds resulting from the exclusive-OR logical operation XOR. It can be seen that the waveforms Dsi and Dsi' are identical. It follows from the foregoing, and it can readily be seen from the remaining waveforms of FIG. 2 that, generally, if a bit stream D and a coded bit stream CD, which latter has been coded by an exclusive-OR logical operation using the bit stream D and a bit keystream BK, are used together in an exclusive-OR operation, then the resulting decoded bit stream will be the bit keystream BK.

Therefore, if when using the algorithm shown in FIG. 2, a portion of a data signal which was used in the production of a received enciphered signal is already known, it becomes possible to determine what certain bytes of the keystream signal Ks should be. Because the bytes of the keystream signal Ks are loaded into the register REG-R, the contents of this register that are needed for a given data output (data signal Ds) are thus readily obtained. This means that one of the 64-bit code inputs into the one-way function OWF is now known. It has been found that only 8 data bytes of an original data signal need be known in order to determine the contents of the register REG-R for a given data output. A trial and error procedure can thereafter be adopted to determine byte-by-byte, the value of the key signal K to be loaded into the register KEY-K using, typically, 16 further known data bytes of the original data signal. This trial and error procedure can be effected using a computer program which for each of the 256 possible values of each byte of the key signal K looks at each output bit on the keystream and compares it with the corresponding bit value already known in the keystream. In this way, the value of the keysignal K is found progressively byte-by-byte. Once the key signal K has been found the security of the system is broken. It is of course to be understood that the form of one-way function used is also known or at least available for use with the discovered key signal K and with the register REG-R loaded initially with discovered bytes of the keystream signal Ks.

It is an object of the present invention to provide a more secure method of digital signal encryption using a cipher algorithm.

According to the present invention there is provided a method of digital signal encryption comprising the steps of:
(a) providing a key signal;
(b) providing an initial number signal;
(c) combining said key signal and said number signal in a cipher algorithm to produce a first keystream signal;
(d) performing an exclusive-OR logical operation with the first keystream signal and a digital data signal to produce an enciphered or a deciphered signal; and
(e) modifying progressively the number signal using a feedback control not involving the actual digital data signal being processed;
which method is characterised in that said feedback control utilises a second keystream signal which is different from said first keystream signal and is derived either indirectly or directly from the latter by at least one logical operation.

When this method according to the invention is employed, the (second) keystream signal used in the cipher algorithm cannot be determined directly by performing an exclusive-OR logical operation using an enciphered data signal and a clear text data signal corresponding to that used to produce the enciphered data signal using said method.

In carrying out the invention, the second keystream signal can be produced by the cipher algorithm from the same combined key signal/number signal data as that used to produce the first keystream signal. Alternatively, the second keystream signal can be produced by performing a further logical operation, for instance another exclusive-OR logical operation involving the first keystream signal as one input thereto.

The invention also extends to arrangements for performing the method set forth above.

In order that the invention may be more fully understood, reference will now be made by way of example to the accompanying drawings, of which:

Figure 1:
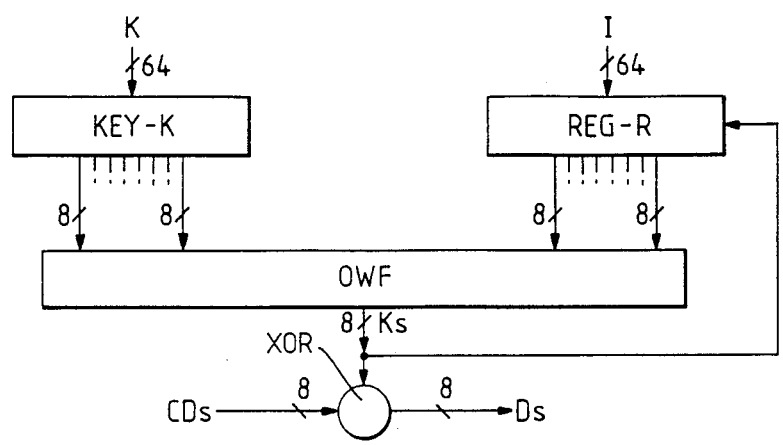
FIG. 1 shows, as aforesaid, a block diagram representing a known cipher algorithm.
Figure 2:
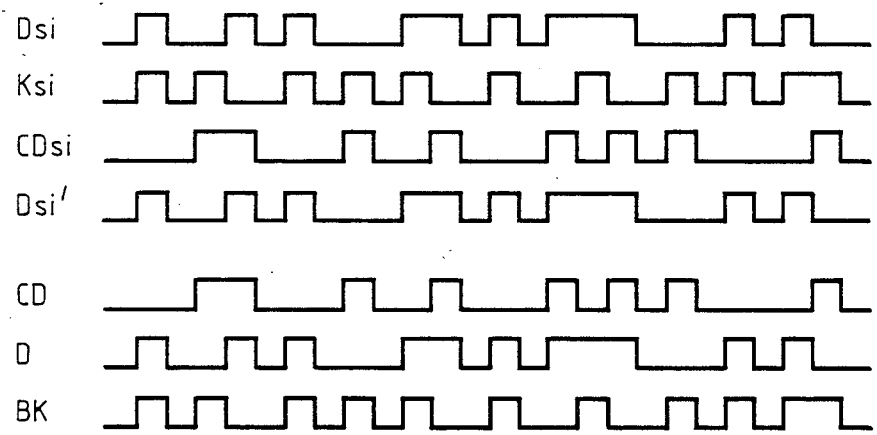
FIG. 2 shows, as aforesaid, some idealised digital waveforms.
Figure 3:
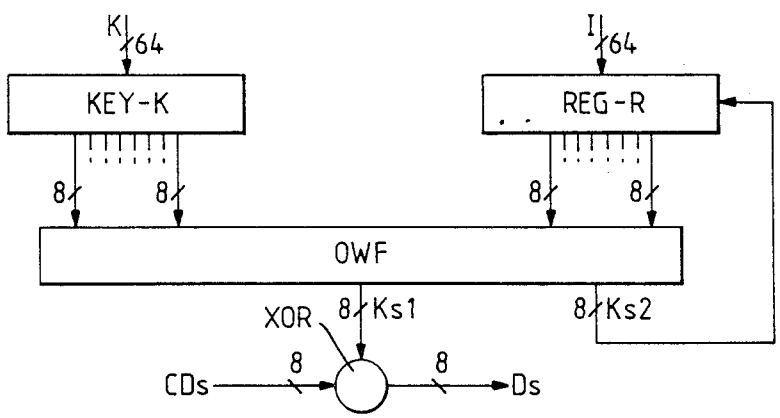
FIG. 3 shows a block diagram representing one form of cipher algorithm for performing the invention.

Referring to FIG. 3, in the block diagram there shown the elements which have counterparts in the block diagram of FIG. 1 have been given the same references as those counterparts. The block diagram of FIG. 3 differs from that of FIG. 1 by the addition of a second keystream signal Ks2 which, in accordance with the invention and as will be described, is derived either indirectly or directly from the first keystream signal. The keystream signal Ks1 corresponds to the keystream Ks which is produced by the known cipher algorithm, but the keystream signal Ks1 is used only for the exclusive-OR logical operation XOR to produce the deciphered data signal Ds from the enciphered data signal CDs. The second keystream signal Ks2 is used in the feedback control of the algorithm and is loaded one 8-bit byte at a time into the register REG-R. Thus, it is not possible to discover the contents of the register REG-R simply by performing an exclusive-OR logical operation with the data signal CDs and a known (deduced) data signal corresponding to the data signal from which the data signal CDs was produced.

Figure 4:
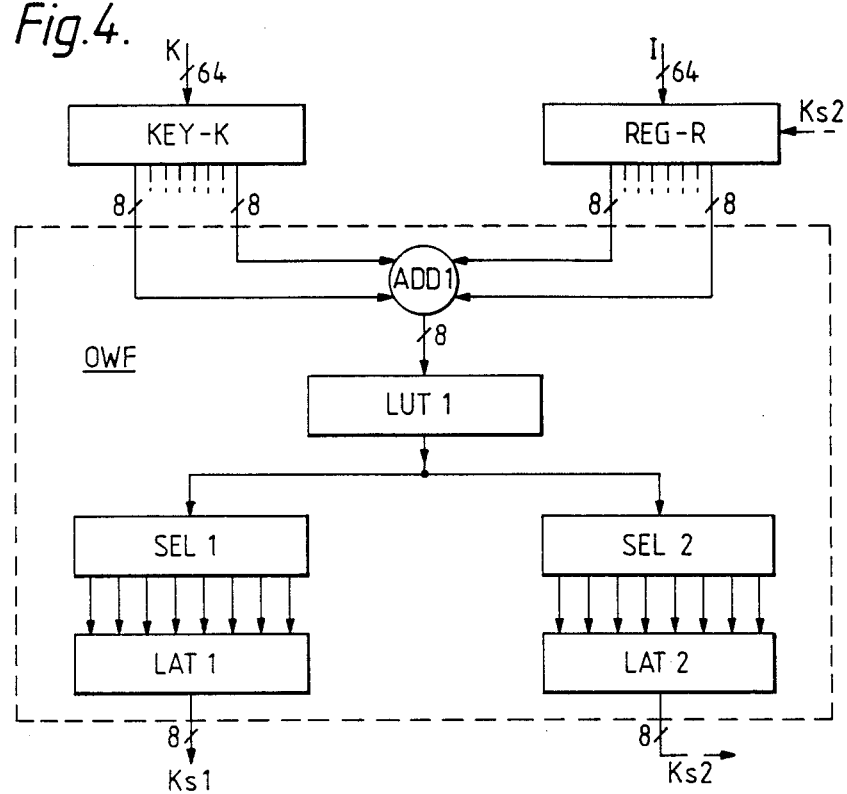
FIG. 4 shows a one-way function for the algorithm of FIG. 3.

A suitable one-way function for the cipher algorithm of FIG. 3 is represented by the block diagram of FIG. 4. The one-way function has an add modulo-256 logical operation ADD1 which adds corresponding 8-bit bytes of keysignal K and the number signal I one at a time, without carry.

Each of the eight 8-bit outputs from the operation ADD1 is used as an 8-bit input to a look-up table process LUT1 which produces an 8-bit output for each 8-bit input. The eight 8-bit outputs from the look-up table process LUT1 undergo two selection processes SEL1 and SEL2 each of which selects successively a different one of the eight bits from the eight 8-bit outputs. The bit selection performed by the two selection processes SEL1 and SEL2 is different. The two groups of eight bits which are selected are latched by respective latching operations LAT1 and LAT2 and form respective different 8-bit bytes for indirectly related keystream signals Ks1 and Ks2, respectively.

Figure 5:
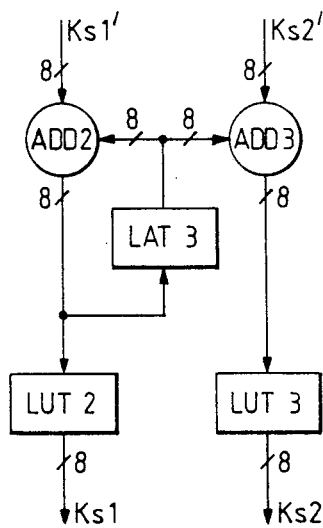
FIGS. 5 and 6 shows respective logical operation extensions for the one-way function of FIG. 4.
Figure 6:
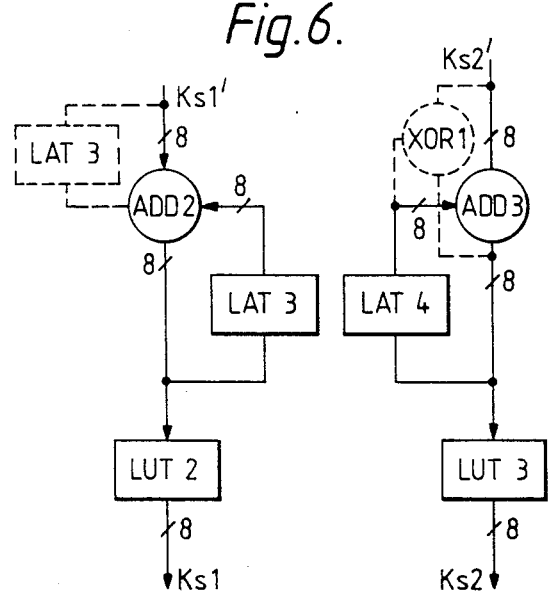

The one-way function procedure can include various logical operation extensions at its output in order to further "mix" the bytes of the keystream signals Ks1 and Ks2. For example, as shown in FIG. 5, the keystream signals from the one-way function OWF can be treated as pre-output values Ks1′ and Ks2′ which are added modulo-256 by respective logical operations ADD2 and ADD3 to the previous 8-bit output value of the operation ADD2 which is held for this purpose by a latching operation LAT3. The 8-bit output values of the operations ADD2 and ADD3 are used as 8-bit input values for respective look-up table processes LUT2 and LUT3. The 8-bit output values from these look-up tables processes then form the 8-bit data bytes of the resultant keystream signals Ks1 and Ks2, respectively. As an alternative to the logical operation extensions shown in FIG. 5, the add logical operation ADD3 may be fed with its own previous 8-bit output value by using a separate latching operation LAT4 as shown in FIG. 6. Also, as shown in dotted lines in FIG. 6, the add logical operation ADD2 may instead be fed with its own previous 8-bit input value of the keystream signal Ks1 using the latching operation LAT3, and/or the add logical operation ADD3 may be replaced by an exclusive-OR logical operation XOR1. Conversely, the add logical operation ADD3 may be fed with its own previous 8-bit input value of the keystream signal Ks2 using the latching operation LAT4, and/or the add logical operation ADD2 may be replaced by an exclusive-OR logical operation.

Figure 7:
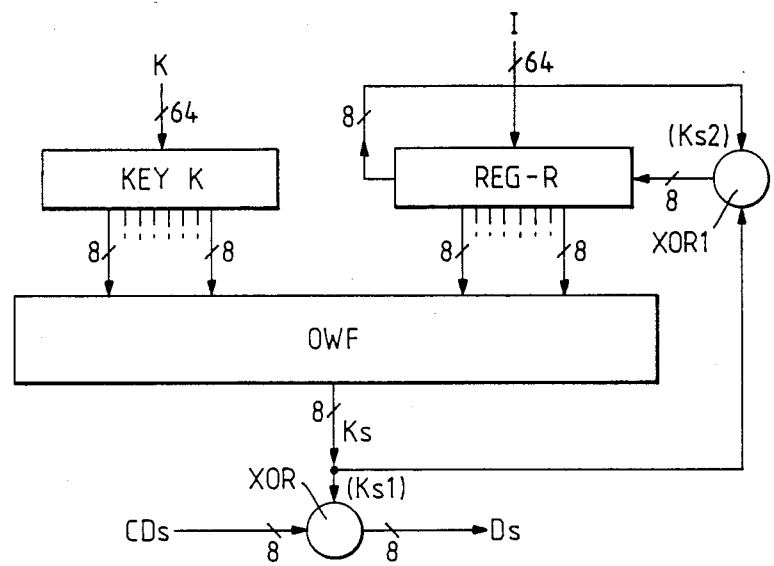
FIGS. 7 and 8 show block diagrams representing respective second forms of cipher algorithm for performing the invention.
Figure 8:
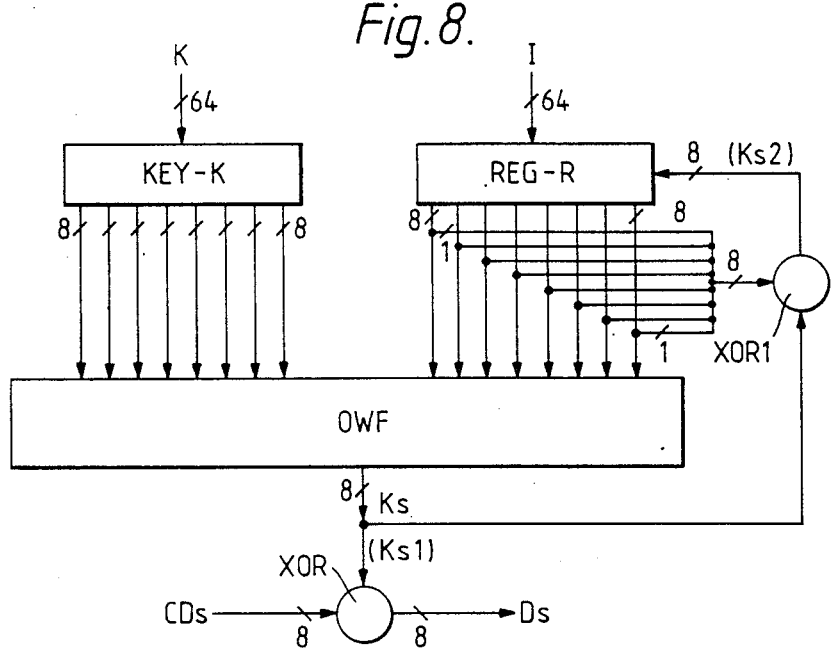

Each of the cipher algorithms shown in FIGS. 7 and 8 produce only a single keystream signal Ks which is modified before being loaded into the register REG-R as a second keystream signal (Ks2). In each algorithm, the one-way function OWF can take the form shown in FIG. 4, or in FIG. 4 as extended by FIG. 5 or FIG. 6, in respect of the keystream signal Ks1. In this instance, therefore, there is no second selection process SEL2 and latching operation LAT2 to produce the keystream signal Ks2 which is now not present.

In each of the algorithms of FIGS. 7 and 8, the keystream signal Ks is applied one byte at a time as one input value to an exclusive-OR logical operation XOR1, the 8-bit output value of which is each time loaded into the register REG-R. In the algorithm of FIG. 7, the second input value to the exclusive-OR logical operation XOR1 is the FIFO (first-in-first-out) 8-bit byte which is removed from the register REG-R when a new byte is loaded into this register from the exclusive-OR logical operation XOR1. In the algorithm of FIG. 8, the second input value to the exclusive-OR logical operation XOR1 is an 8-bit byte formed by single bits taken one from each of the eight 8-bit bytes present in the register REG-R at any time.

Figure 9:
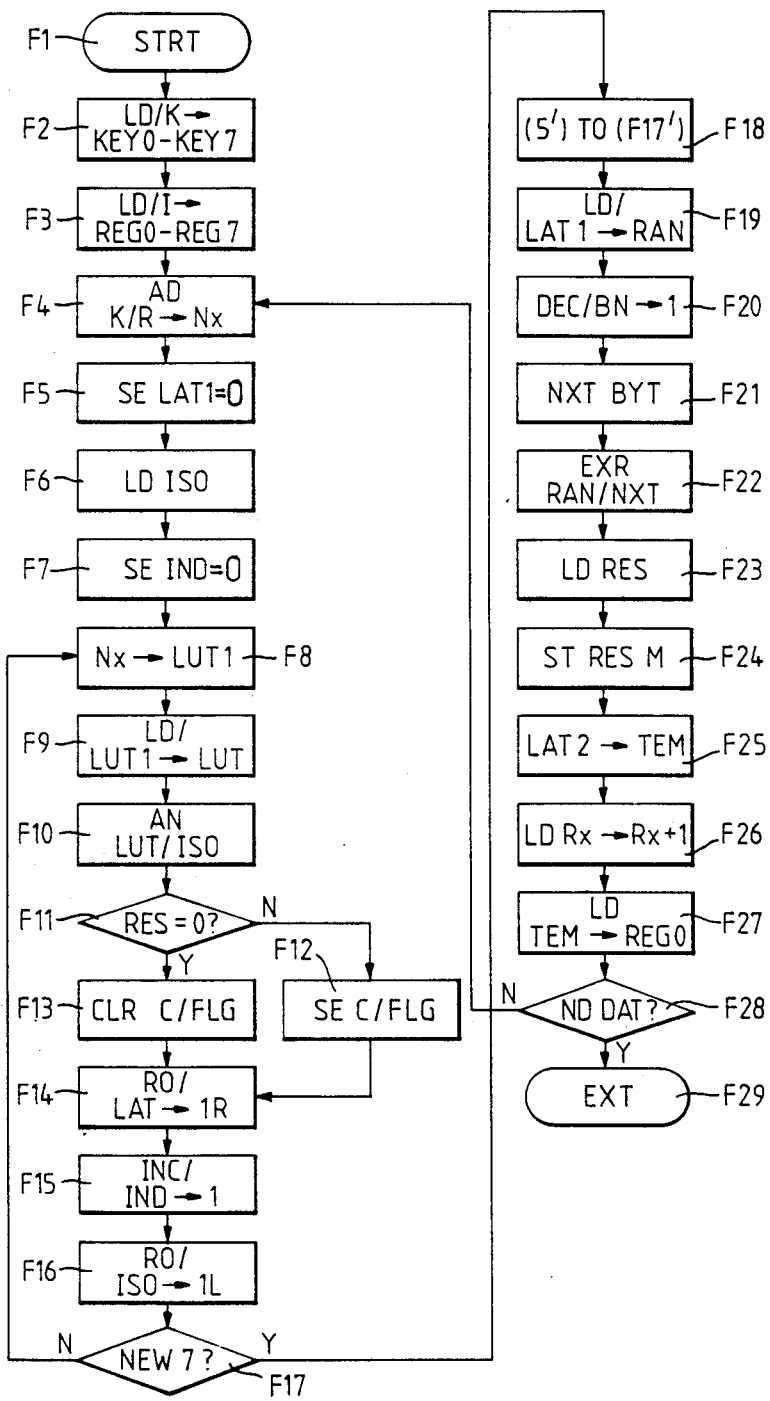
FIGS. 9 to 11 show flow charts giving steps which are carried out by a logic processor arrangement in the performance of the invention.

The cipher algorithm shown in FIGS. 3 and 4 can be performed using a conventional processor arrangement which is programmed according to the flow chart shown in FIG. 9. In this flow chart, the legends in the various boxes represent the following instructions or decisions:

| | |
|---|---|
| (F1) STRT:- | Enter the algorithm. |
| (F2) LD/K → KEY0-KEY7:- | Load into the key register KEY-K the particular key signal K to be used for enciphering/deciphering. (It is assumed that the key register KEY-K is made up of eight 8-bit registers KEY0-KEY7). |
| (F3) LD/I → REG0-REG7:- | Load into the register REG-R the initial number signal I. (It is assumed that the register REG-R is made up of eight 8-bit registers REG0-REG7). |
| (F4) AD K/R→ Nx:- | Perform the logical operation ADD1 by adding modulo-256 the contents of the registers KEY0 to KEY7 with the contents of the registers REG0 to REG7 to produce eight new 8-bit bytes which are stored in respective registers NEW0 to NEW7. (i.e. KEY0 to REG0 → NEW0 KEY1 to REG1 → NEW1 — — KEY7 to REG7 → NEW7). |
| (F5) SE LAT1 = 0 :- | Set to '0' a register "LATCH1" which performs the latching operation LAT1 and in which are recorded the successive single bit values as produced by the selection process SEL1. (The following steps (F6) to (F19) carry out the selection process SEL1). |
| (F6) LD ISO:- | Load a register "ISOLATE" with an initial value 00000001. |
| (F7) SE IND = 0:- | Set to '0' a register "INDEX" which is used to count the successive selections performed by the selection process SEL1. |
| (F8) Nx → LUT1:- | Use the bytes in each of the registers NEW0 to NEW7 in turn, as selected by the index value in the register "INDEX", to obtain an 8-bit output by the look-up TABLE process LUT1. |
| (F9) LD/LUT1 → LUT:- | Load into a register "LUTOUT" the 8-bit output resulting from the look-up table process LUT1. |
| (F10) AN LUT/ISO:- | Perform an AND logical operation (multiplication) with the contents of the registers "LUTOUT" and "ISOLATE". (The result of this AND logical operation is that the bit position which contains a '1' in |

| | |
|---|---|
| | the register "ISOLATE" will result in a '1' when the corresponding bit position in the register "LUTOUT" also contains a '1' and will result in a '0' when there is a '0' in this corresponding bit position. The result in all other bit positions will be a '0' irrespective of the other bit values in the register "LUTOUT"). |
| (F11) RES = 0 | Perform an interrogation logical operation for determining whether the result of the AND logical operation in step (F10) is a '0' or a '1'. |
| (F12) SE C/FLG:- | Set a carry flag when the interrogation in step (F11) signifies a '1'. (The result of this step (F12) is to insert a '1' into the least significant bit position of the register "LATCH1". |
| (F13) CLR C/FLG-: | Clear the carry flag when the interrogation in step (F11) signifies a '0'. (The result of this step (F13) is that a '0' is allowed to remain in the least significant bit position of the register - "LATCH1". |
| (F14) RO/LAT1 → 1R:- | Rotate the contents of the register "LATCH1" one bit position to the right. (The effect of this step (F14) is to allow a '1' or a '0' for the next bit position of the register to be entered in at the least significant bit position when steps (F10) to (F13) are repeated). |
| (F15) INC/IND → 1:- | Increment by one the register "INDEX". |
| (F16) RO/ISO → 1L:- | Rotate the contents of the register "ISOLATE" one bit position to the left. (The effect of this step (F16) is to cause the AND logical operation of step (F10) to operate on the next higher order bit of the 8-bit byte in the register "LUTOUT"). |
| (F17) NEW 7?:- | Perform an interrogation logical operation for determining whether the successive selections of single bits from the contents of the register "LUTOUT" have been completed. (If not, then step (F8) is returned to for the next selection and so on, until the register "LATCH1" contains in respect of the keystream signal Ks1 a whole 8-bit byte formed from the single bits selected by the selection process SEL1). |
| (F18) (F5') to (F17'):- | Perform the steps (F5) to (F17) in respect of the keystream signal Ks2. (In this case, the register "ISOLATE" would be loaded with a different initial value e.g 0000 0010 so that the bits selected by the selection process SEL2 from the bytes in the register "LUTOUT" would be different to those selected by the selection process SEL1. The result of the selection process SEL2 is stored in a register "LATCH2" which performs the latching operation LAT2. |
| (F19) LD/LAT1 → RAN:- | Load into a register "RANDOM" the contents of the register "LATCH1". |

(The contents of the register "RANDOM" constitute an 8-bit byte of the keystream signal Ks1. This byte is exclusive-OR'd with a data byte of the enciphered data signal CDs. The contents of the register "RANDOM" are then changed by loading therein a new byte of the keystream signal Ks1, which new byte is exclusive-OR'd with the next data byte, and so on, until all the data bytes of a given plurality N thereof have been dealt with. The number N is stored in a byte number register "BYTNUMB". The actual enciphered data bytes are stored in a memory. The following steps F20 to F29 perform the necessary operations).

| | |
|---|---|
| (F20) DEC/BN → 1:- | Decrement by one the register "BYTNUMB". |
| (F21) NXT BYT:- | Obtain the next enciphered data byte from the memory. |
| (F22) EXR RAN/NXT:- | Perform an exclusive-OR logical operation on the contents of the register "RANDOM" and the next byte obtained in step (F21). |

| | |
|---|---|
| (F23) LD RES:- | Load into a register "RESULT" the result of the exclusive-OR logical operation of step (F22). |
| (F24) ST RES M:- | Store in the memory the contents of the register "RESULT".<br>(These contents form a deciphered data byte of the data signal Ds). |
| (F25) LAT2 → TEM:- | Load the contents of the register "LATCH2" into a temporary register "TEMPRI" |
| (F26) LD Rx → Rx+1:- | Advance by one register the contents of the registers REG0-REG6.<br>(i.e. move the contents of REG0 → REG1<br>REG1 → REG2<br>—<br>—<br>—<br>REG6 → REG7.<br>The effect of this is to leave the register REG0 empty so that it can be loaded with new data in the next step (F27), thereby completely changing the number signal I in the register REG-R). |
| (F27) LD TEM → REG0:- | Load the contents of the register "TEMPRI" into the register REG0. |
| (F28) ND DAT?:- | Perform an interrogation logical operation for determining whether all the bytes of the data signal CDs stored in the memory have been deciphered, as signified by the byte count in the register "BYTNUMB".<br>(If there are still data bytes to be deciphered, then step (F4) is returned to and deciphering of the next data byte commences). |
| (F29) EXT:- | Exit the algorithm when all of the data bytes have been deciphered. |

Figure 10:
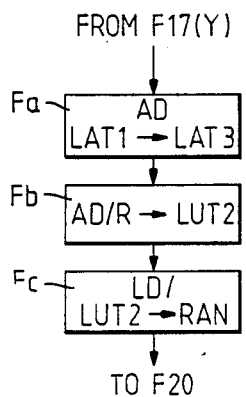

The modifications illustrated in FIGS. 5 and 6 can be readily implemented by incorporating appropriate additional steps in the flow chart of FIG. 9. For example, the production of the keystream signal Ks1 in accordance with the basic modification of FIG. 5 can be implemented by the following additional steps (Fa) to (Fc) shown in FIG. 10 between steps (F17) and (F18) of FIG. 9.

| | |
|---|---|
| (Fa) AD LAT1 → LAT3:- | Add modulo-256 the contents of the register "LATCH1" to that of a further register "LATCH3" which performs the latching operation LAT3, and store the result in the register "LATCH3". |
| (Fb) AD/R → LUT2:- | Use the addition result of step (Fa) to obtain an 8-bit output by a look-up table process LUT2. |
| (Fc) LD/LUT2 → RAN:- | Load into the register "RANDOM" the 8-bit output from the look-up TABLE process LUT2.<br>(This step (Fc) replaces step (F19)). |

Figure 11:
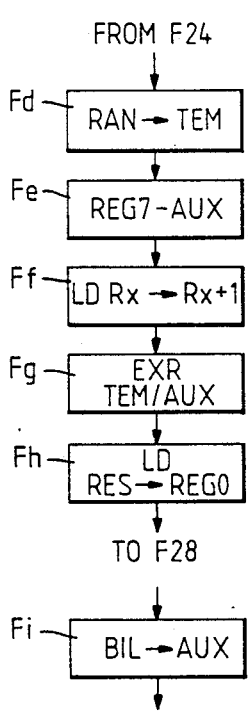

In order to implement the algorithm represented in FIG. 7, steps (F1) to (F24) can be used in respect of the keystream signal Ks1. As there is now no keystream signal Ks2, step (F18) is absent and steps (F25), (F26) and (F27) are replaced by new steps (Fd) to (Fh) as shown in FIG. 11.

| | |
|---|---|
| (Fd) RAN→TEM:- | Load the contents of the register "RANDOM" into a temporary register "TEMPRI". |
| (Fe) REG7-AUX:- | Load the contents of the register REG7 into an auxiliary register "AUXREG". |
| (Ff) LD Rx → Rx+1:- | This step corresponds to step (F26) in FIG. 9. |
| (Fg) EXR TEM/AUX:- | Perform an exclusive-OR logical operation on the contents of the registers "TEMPRI" and "AUXREG". |
| (Fh) LD RES → REG0:- | Load into the register REG0 the reuult of the exclusive-OR logical operation of step (Fg). |

In the case of the algorithm of FIG. 8, steps (Fd) to (Fh) also apply, except that step (Fe) is replaced by a further step (Fi) BIL→AUX which is an instruction to load into the auxiliary register "AUXREG" a corresponding bit from bytes in each of the registers REG0 to REG7.

Figure 12:
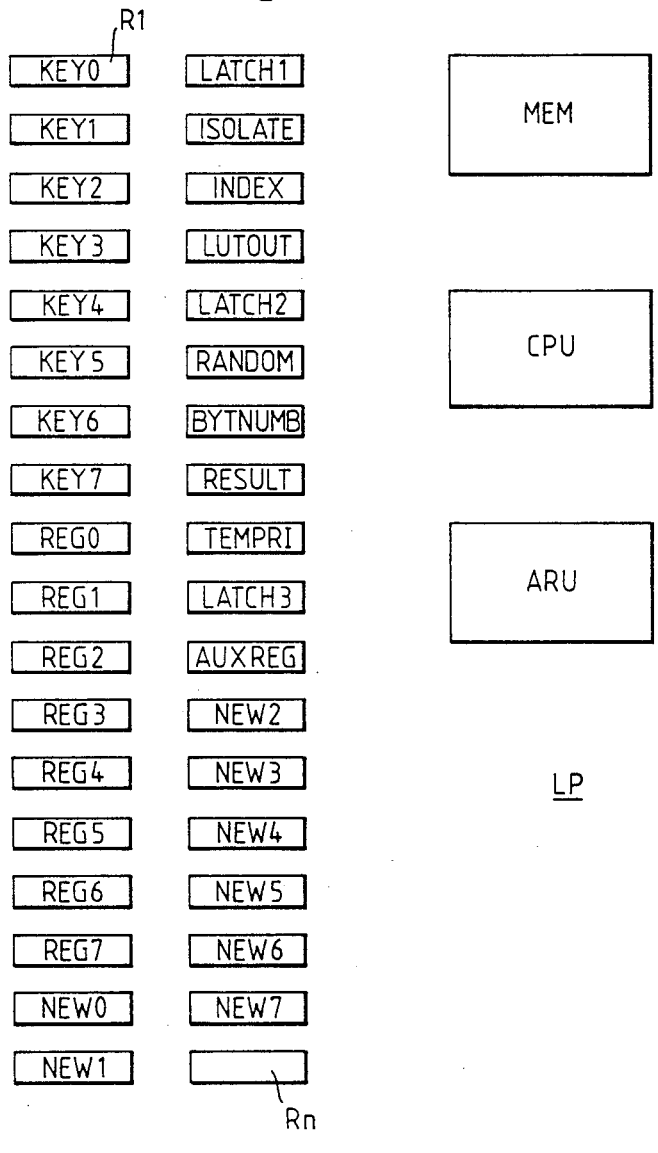
FIG. 12 shows diagrammatically certain elements of such a logic processor arrangement.

FIG. 12 is a block diagram in which the constituent parts of a logic processor LP are represented. This block diagram shows a memory MEM, a central processing unit CPU, an arithmetic unit ARU, and registers R1 to Rn which serve as the various registers specified in the flow charts of FIGS. 9, 10 and 11. These elements are assumed to be interconnected in conventional manner by means of address, data and control buses (not shown). Such a logic processor can be a commercially available microprocessor, for instance, one from the 8400 Series (Philips).

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be apparent to persons skilled in the art, whether or not it relates to the same invention as presently claimed in any claim and whether or not it mitigates any or all of the same technical problems as does the present invention. The applicants hereby reserve the right to formulate new claims to such features and/or combinations of such features during the prosecution of the present application or of any further application derived therefrom.

I claim:

1. A method of digital signal encryption comprising the steps of:
   (a) providing a key signal;
   (b) providing an initial number signal;
   (c) combining said key signal and said number signal in a cipher algorithm to produce a first keystream signal;
   (d) performing an exclusive-OR logical operation with the first keystream signal and a digital data signal to produce an enciphered or a deciphered signal;
   (e) modifying progressively the number signal using a feedback control with a second keystream signal which is different from said first keystream signal and is derived either indirectly or directly from the latter by at least one logical operation not involving the actual digital data signal being processed wherein the second keystream signal is produced by the cipher algorithm from the same combined key signal/number signal data as that used to produce the first keystream signal;
   (f) providing the key signal with m bytes each containing n bits;
   (g) providing the initial number signal also with m bytes each containing n bits;
   (h) adding modulo-$2^n$ each key signal byte and a respective initial number signal byte to produce m new bytes each containing n bits;
   (i) using each of the m new bytes in a function to obtain m modified bytes;
   (j) selecting a first different bit from each of the modified new bytes to obtain a first single resultant byte which constitutes a byte of the first keystream signal;
   (k) selecting a second different bit from each of the modified new bytes to obtain a second single resultant byte which constitutes a byte of the second keystream signal;
   (l) replacing one of the initial number signal bytes with the second single resultant byte for the second keystream signal to form a new initial number signal; and
   (m) repeating steps (h) to (l) until all the data bytes of the digital data signal have been dealt with by performing the exclusive-OR logical operation with successive bytes of the first keystream signal and the digital data signal.

2. A method as claimed in claim 1, characterised in that step (i) is performed by using each of the m new bytes to address a look-up table to obtain the m modified new bytes.

3. A method as claimed in claim 1 or claim 2, characterised by including the further steps of:
   (n) adding modulo-$2^n$ each first single resultant byte and each second single resultant byte to the preceding first single resultant byte, to produce respective sum bytes which now constitute bytes for the first and second keystream signals, respectively, this further step being performed after each of the steps (j) and (k).

4. A method as claimed in claim 1 or claim 2, characterised by including the further steps of:
   (o) adding modulo-$2^n$ each first single resultant byte and each second single resultant byte to the preceding first and second single resultant bytes respectively, to produce respective sum bytes which now constitute bytes for the first and second keystream signals, respectively, this further step being performed after each of the steps (j) and (k).

5. A modification of the method as claimed in claim 3 or claim 4, characterised in that at least one of the modulo-$2^n$ adding logical operation is replaced by an exclusive-OR logical operation.

6. A modification of the method claimed in claim 4, characterised in that in respect of at least one of the first and second single resultant bytes the logical operation (adding modulo-$2^n$ or exclusive-ORing, as the case may be), performed thereon uses the succeeding single resultant byte instead of the preceding single resultant byte.

7. A method as claimed in claim 1, characterised in that the second keystream signal is produced by performing a further logical operation involving the first keystream signal as one input thereto.

8. A method as claimed in claim 7, characterised in that said further logical operation is an exclusive-OR logical operation in which the first keystream signal is exclusive-OR'd with the subsisting number signal.

9. A method as claimed in claim 1, claim 7 or claim 8, characterised by comprising the steps of:
   (r) providing the key signal with m bytes each containing n bytes;
   (s) providing the initial number signal also with m bytes each containing n bits;
   (t) adding modulo-$2^n$ each key signal byte and a respective initial number signal byte to produce m bytes each containing n bits;
   (u) selecting a different bit from each of the new bytes to obtain a single resultant byte which constitutes a byte of the first keystream signal;
   (v) performing an exclusive-OR logical operation using each single resultant byte with a byte taken from the initial number signal to produce a new single resultant byte which constitutes a byte of the second keystream signal;

(w) replacing one of the initial number bytes with the new single resultant byte to form a new initial number signal; and (x) repeating steps (t) to (w) until all the data bytes of the digital data signal have been dealt with by performing the exclusive-OR logical operation with successive bytes of the first keystream signal and the digital data signal.

10. A method as claimed in claim 9, characterised in that each of the m bytes of the initial number signal as progressively altered by step (w) are used in turn for successive performances of the exclusive-OR logical operation for that step.

11. A method as claimed in claim 9, characterised in that a single bit from each of the m bytes of the initial number signal as progressively altered by step (w) are used to form a byte for each performance of the exclusive-OR logical operation for that step.

12. An arrangement for digital signal encryption comprising:

means for providing a key signal;

means for providing an initial number signal;

means for combining said key signal and said number signal in a cipher algorithm to produce a first keystream signal;

means for performing an exclusive-OR logical operation with the first keystream signal and a digital data signal to produce an enciphered or a deciphered signal;

means for modifying progressively the number signal using a feedback control not involving the actual digital data being processed;

logic operation means provided for producing for said feedback control a second keystream signal which is different from said first keystream signal and is derived either indirectly or directly from the latter by at least one logical operation;

the logic operation means operable to produce said second keystream signal from the same combined key signal and number signal data as that used to produce the first keystream signal;

means for providing the key signal with m bytes each containing n bits;

means for providing the initial number signal also with m bytes each containing n bits;

means for adding modulo-$2^n$ each key signal byte and a respective initial number signal byte to produce m new bytes each containing n bits;

means for using each of the m new bytes in a function to obtain m modified bytes;

means for selecting a first different bit from each of the modified new bytes to obtain a first single resultant byte which constitutes a byte of the first keystream signal;

means for selecting a second different bit from each of the modified new bytes to obtain a second single resultant byte which constitutes a byte of the second keystream signal; and means for replacing one of the initial number signal bytes with the second single resultant byte for the second keystream signal to form a new initial number signal.

13. An arrangement as claimed in claim 12, characterised in that a look-up table is used to obtain the m modified new bytes from the m new bytes.

14. An arrangement as claimed in claim 12 or claim 13, characterised by including means for adding modulo-$2^n$ each first single resultant byte and each second single resultant byte to the preceding first single resultant byte, to produce respective sum bytes which now constitute bytes for the first and second keystream signals, respectively.

15. An arrangement as claimed in claim 12 or claim 13, characterised by including means for adding modulo-$2^n$ each first single resultant byte and each second single resultant byte to the preceding first and second single resultant bytes respectively, to produce respective sum bytes which now constitute bytes for the first and second keystream signals, respectively.

16. A modification of the arrangement as claimed in claim 14, characterised in that at least one of the means for performing the adding modulo-$2^n$ logical operation is replaced by means for performing an exclusive-OR logical operation.

17. A modification of the arrangement claimed in claim 15, characterised in that in respect of at least one of the first and second single resultant bytes the means for adding modulo-$2^n$ or exclusive-OR logical operations, as the case may be, uses the succeeding single resultant byte instead of the preceding single resultant byte for its operation.

18. An arrangement as claimed in claim 12, characterised in that the second keystream signal is produced by means performing a further logical operation involving the first keystream signal as one input thereto.

19. An arrangement as claimed in claim 18, characterised in that said further logical operation means performs an exclusive-OR logical operation in which the first keystream signal is exclusive-OR'd with the subsisting number signal.

20. An arrangement as claimed in claim 12, claim 18 or claim 19, characterised by comprising:

means for providing the key signal with m bytes each containing n bits;

means for providing the initial number signal also with m bytes each containing n bits;

means for adding modulo-$2^n$ each key signal byte and a respective initial number signal byte to produce m bytes each containing n bits;

means for selecting a different bit from each of the new bytes to obtain a single resultant byte which constitutes a byte of the first keystream signal;

means for performing an exclusive-OR logical operation using each single resultant byte with a byte taken from the initial number signal to produce a new single resultant byte which constitutes a byte of the second keystream signal; and means for replacing one of the initial number bytes with the new single resultant byte to form a new initial condition number.

21. An arrangement as claimed in claim 20, characterised in that each of the m bytes of the initial number signal as progressively altered by said replacement means are used in turn for successive performances of the exclusive-OR logical operation.

22. An arrangement as claimed in claim 20, characterised in that a single bit from each of the m bytes of the initial number signal as progressively altered by said replacement means are used to form a byte for each performance of the exclusive-OR logical operation.

23. A modification of the method as claimed in claim 4, characterised in that at least one of the modulo-$2^n$ adding logical operations is replaced by an exclusive-OR logical operation.

24. A modification of the method claimed in claim 5, characterised in that in respect of at least one of the first and second single resultant bytes the logical operation adding modulo-$2^n$ or exclusive-ORing, as the case may be, performed thereon uses the succeeding single resultant byte instead of the preceding single resultant byte.

25. A modification of the arrangement as claimed in claim 15, characterised in that at least one of the means for performing the adding modulo-$2^n$ logical operations is replaced by means for performing an exclusive-OR logical operation.

26. A modification of the arrangement claimed in claim 16, characterised in that in respect of at least one of the first and second single resultant bytes the means for adding modulo-$2^n$ or exclusive-OR logical operations, as the case may be, uses the succeeding single resultant byte instead of the preceding single resultant byte for its operation.

* * * * *